United States Patent [19]

Blaine

[11] 4,159,128
[45] Jun. 26, 1979

[54] VEHICLE SUSPENSION SYSTEM INCLUDING WHEEL-TILTING MECHANISM

[75] Inventor: Ted. E. Blaine, Miami, Okla.

[73] Assignee: Ferol B. Blaine, Tulsa, Okla. ; a part interest

[21] Appl. No.: 852,793

[22] Filed: Nov. 18, 1977

[51] Int. Cl.² .............................................. B62D 9/02
[52] U.S. Cl. .................................. 280/772; 280/95 R;
280/666; 280/112 A
[58] Field of Search ................. 280/772, 112 A, 95 R,
280/660, 661, 663, 666, 667

[56] References Cited
U.S. PATENT DOCUMENTS

| | | | |
|---|---|---|---|
| 1,556,531 | 10/1925 | McMillin | 280/95 R |
| 2,206,970 | 7/1940 | Megow | 280/772 X |
| 2,652,263 | 9/1953 | Varnum | 280/666 X |
| 2,689,747 | 9/1954 | Kolbe | 280/112 A |
| 2,852,268 | 9/1958 | Johnson | 280/112 A X |
| 3,137,513 | 6/1964 | Marot | 280/112 A |

*Primary Examiner*—John P. Silverstrim
*Attorney, Agent, or Firm*—Schmidt, Johnson, Hovey & Williams

[57] ABSTRACT

A vehicle suspension system associated with a pair of laterally spaced, steerable wheels includes novel wheel-control mechanism operable in response to steering of the vehicle during a turn thereof for tilting the outside wheel at a greater angle than the inside wheel in the direction of the turn in order to automatically compensate for the effects of lateral forces acting on the wheels which tend to be greater on the wheel tracking the outside path of the turn compared with those forces acting on the wheel tracking the inside path due to the lateral shifting of the vehicle's weight as a result of body roll or the like.

11 Claims, 5 Drawing Figures

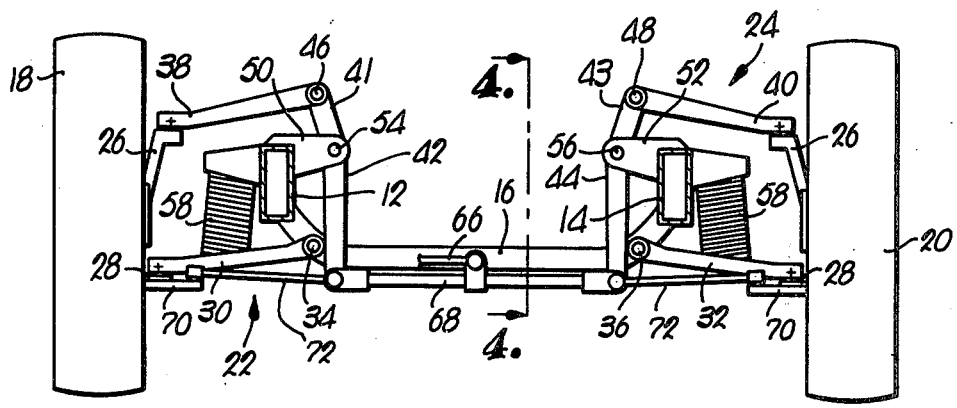

VEHICLE SUSPENSION SYSTEM INCLUDING WHEEL-TILTING MECHANISM

BACKGROUND AND BRIEF DESCRIPTION OF THE INVENTION

This invention generally relates to vehicle suspension systems which include mechanism for tilting the vehicle's ground-engaging wheels in the direction of a turn, and deals more particularly with a system of the mentioned type in which the mechanism is automatically controlled by the vehicle's steering system.

Others have been aware for sometime of the importance of maintaining the upright attitude of a vehicle's wheels during the execution of a turn by the vehicle, and the use of wheel-tilting mechanisms for "banking" a vehicle's wheels into a turn, that is, tilting the wheels in the direction of the turn, is therefore an art-recognized concept. Also established in the art is the advantage of interconnecting the wheel-tilting mechanism with the vehicle's steering system, so that the latter may automatically operate the tilting mechanism during a turn executed by the vehicle; a typical arrangement of this type is shown in U.S. Pat. No. 2,652,263, issued Sept. 15, 1953 to Varnum.

Previous systems such as that shown by Varnum are operative to tilt the vehicle's wheels essentially equal amounts during any given turn of the vehicle, and perform satisfactorily only when the same magnitude of lateral force is acting on each of the wheels. Many vehicles, such as the common passenger automobile, are provided with rather loosely sprung suspension systems to minimize shock transmission and permit a smooth, comfortable ride; in vehicles of this type the vehicle tends to "lean" away from the direction of a turn due to body roll, and consequently, a portion of the vehicle's weight is transferred from the wheels tracking the inside path of the turn to the wheels tracking the outside path thereof. As a result of this additional weight imposed on the "outside" wheels (in addition to other factors), the lateral, inertial force acting upon the inside wheels is less than that acting upon the outside wheels so that the latter are caused to tilt outwardly (away from the direction of the turn) to a greater degree than that of the inside wheels. Inasmuch as prior art wheel-tilting arrangements are limited in their operation for tilting the inside and outside wheels in equal amounts, only the wheels associated with one side of the vehicle can be maintained in the desired vertical position, and the disparity between the attitudes of the inside and outside wheels is not corrected. Thus, there is a need in the art for a steering-system-controlled, wheel-tilting mechanism which not only simultaneously tilts the wheels on each side of the vehicle during a turn, but also compensates for the additional lateral force imposed on the outside tracking wheels by tilting the latter a greater degree than the inside wheels.

According to the present invention, a steering-system-controlled, wheel-tilting mechanism is provided for selectively tilting each of a pair of laterally spaced, steerable wheels, each of the latter being independently suspended upon a frame associated with the vehicle. Each wheel is provided with an axle assembly, including a mounting spindle for pivotally connecting an upper and lower swing arm between the vehicle's frame and the axle assembly to swingably mount the wheel on the vehicle. The upper swing arm is pivotally connected to a normally inclined control link portion of the upper extremity of an upwardly extending lever control arm which has central portions thereof pivotally connected to the frame while the other extremity thereof is pivotally connected to transversely shiftable steering linkage. Transverse shifting of the steering linkage during a turn produces pivotal movement of the lever control arm which, in turn, imparts rotational motion to the control link portion thereof. The control link portion of the lever control arm functions as a crank element to translate the rotational motion produced by the control arm during a turn to a linear, transverse movement which is communicated to the upper swing arm whereby to produce transverse shifting of the latter and effect the tilting of the wheels. The magnitude of transverse shifting of each of the upper swing arms is determined by the angle at which the control link portions are inclined from vertical. The control link portions of the control arms diverge from opposite sides of their respectively associated frame pivot points so that greater transverse displacement of the upper swing arm on the right side of the vehicle is effected, compared to the displacement of the left upper swing arm to produce greater compensating tilting of the right wheel than of the left wheel when the vehicle executes a left turn, and vice versa.

A primary object of the present invention is to provide a novel suspension system for a steerable, wheeled vehicle including especially simply mechanism controlled by the vehicle's steering system for tilting the steerable wheels of the vehicle during the execution of a turn by the latter in the direction of the turn in order to compensate for the effects of lateral forces acting upon the wheels and thereby maximize wheel traction and prolong tire life.

Another object of the invention is to provide mechanism of the mentioned type which includes linkage means to selectively tilt each of a pair of laterally spaced, steerable wheels differing degrees in the same direction in accordance with the differing magnitudes of lateral force respectively acting on such wheels.

A further object of the invention is to provide linkage of the mentioned type which functions to tilt the outside tracking wheel of the vehicle in the direction of a turn by the latter to a greater degree than the degree of tilt imposed upon the inside tracking wheel.

A still further object of the invention is to provide linkage means of the type described which also function in part to independently suspend each of the wheels on the vehicle's frame for swinging movement, but yet which do not affect the tilt attitude of the wheels unless the vehicle is executing a turn.

Another object of the present invention is to provide linkage means of the mentioned type, which include swing arms respectively associated with each of the wheels for carrying the latter on the vehicle's frame that are simultaneously transversely shiftable to produce tilting of the associated wheels.

Other and further objects of the invention will be made clear or become apparent in the course of the following description of a preferred embodiment of the invention.

DETAILED DESCRIPTION OF THE INVENTION

Figure 1:
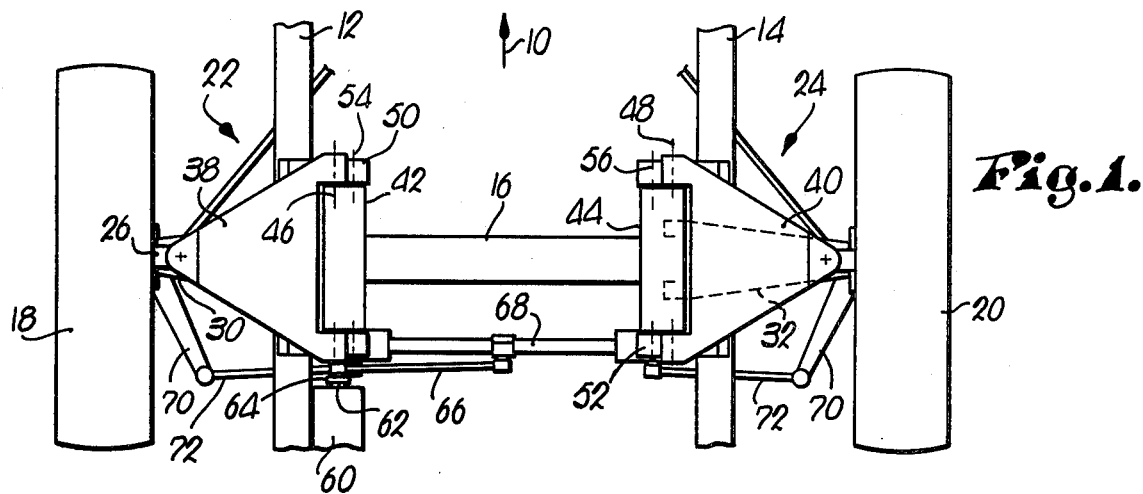
FIG. 1 is a fragmentary, top plan view of a vehicle frame and wheel suspension system which forms the preferred embodiment of the invention, the vehicle's wheels being shown in an untilted, upright condition for straight-ahead travel.

Referring first to FIGS. 1 through 4, a vehicle adapted for ordinarily traveling in the forward direction of travel indicated by the arrow 10 in FIG. 1 includes frame structure comprising left and right laterally spaced, longitudinally extending frame members 12 and 14, respectively joined together by a transversely extending, downwardly bowed cross frame member 16. Left and right, ground-engaging, steerable wheel respectively designated by the numerals 18 and 20 support the frame structure by means of a novel suspension system, including a suspension mechanism associated with each of the wheels 18 and 20, and broadly designated by the numerals 22 and 24, respectively.

Conventional wheel axle assemblies respectively associated with each of the wheels 18 and 20 are provided for carrying the latter, and each includes a spindle mounting of the known type having vertically spaced, upper and lower mounting supports 26 and 28 which extend inwardly from the associated wheel and are spaced on opposite sides of the latter's rotational axis. Each of the supports 26 and 28 has secured thereto a coupling element (not shown), preferably ball-shaped, to provide ball-joint mounting of later discussed suspension components. Left and right, lower swing arms 30 and 32 each respectively include a bifurcated interior extremity connected to the arcuate ends of the cross frame member 16 for swinging movement in a vertical plane about the respective pivots 34 and 36, the outer ends of each of the swing arms 30 and 32 being pivotally connected to the lower mounting supports 28 associated with the corresponding wheels 18 and 20 for pivotal movement about corresponding longitudinal axes. Left and right connecting members in the form of transversely extending, triangularly shaped, upper swing arms 38 and 40 respectively have the outwardly depending apex thereof adapted for pivotally coupling with the associated upper mounting support 26 in a ball-joint fashion, while the base side thereof opposite said apex is bifurcated to receive and pivotally connect with the upper extremities 41 and 43 of corresponding left and right control levers 42 and 44 for swinging movement about a longitudinally extending axis through the associated pivot points 46 and 48. From the foregoing it is apparent that upper swing arms 38 and 40 respectively cooperate with lower swing arms 30 and 32 to essentially independently suspend the associated wheels 18 and 20 from the vehicle's frame structure for tilting motion with respect to the latter while also allowing the wheels 18 and 20 to pivot about respective corresponding upright axes to permit turning of the vehicle.

Left and right, transversely extending mounting brackets 50 and 52 are respectively secured to frame members 12 and 14, and each includes a bifurcated portion within which central stretches of the upwardly extending control levers 42 and 44 are pivotally connected therewith for pivoting about corresponding longitudinal axes defined by the respective pivot points 54 and 56. Brackets 50 and 52 also each include an outwardly extending portion which forms a retaining housing for receiving the upper ends of a compression spring 58, the lower end of the latter being suitably secured to the associated swing arms 30 and 32 in order to spring the suspension mechanisms 22 and 24.

Operator-controlled steering apparatus partially indicated by the numeral 60 includes an output shaft 62 rotatable in accordance with positioning of the vehicle's manual steering means (such as an ordinary steering wheel). Shaft 62 is secured to one extremity of a drag link 64. The opposite end of the link 64 is pivotally connected to one end of a force-transmitting connecting rod 66. The other end of the rod 66 is pivotally connected to a central stretch of the transversely extending, reciprocable steering bar 68. Steering bar 68 has the opposite extremities thereof pivotally connected to the lower respective ends of control levers 42 and 44. A pair of steering pull rods 70, respectively associated with the wheels 18 and 20, each have one end thereof rigidly secured to the corresponding lower mounting support 28, and extends horizontally, rearwardly inward. The opposite end of each pull rod 70 is pivotally connected to one end of an associated connecting element 72, the other end of the connecting element 72 being pivotally connected to the corresponding extremity of the steering bar 68. It is apparent at this point that the operator-controlled steering apparatus 60 is connected through a series of linkage elements to the pull rods 70 for imposing a torque on the latter to produce simultaneous turning of the wheels 18 and 20, and is further connected to the control levers 42 and 44 for transmitting force to each of the latter during the turning of the wheels 18 and 20.

Figure 2:
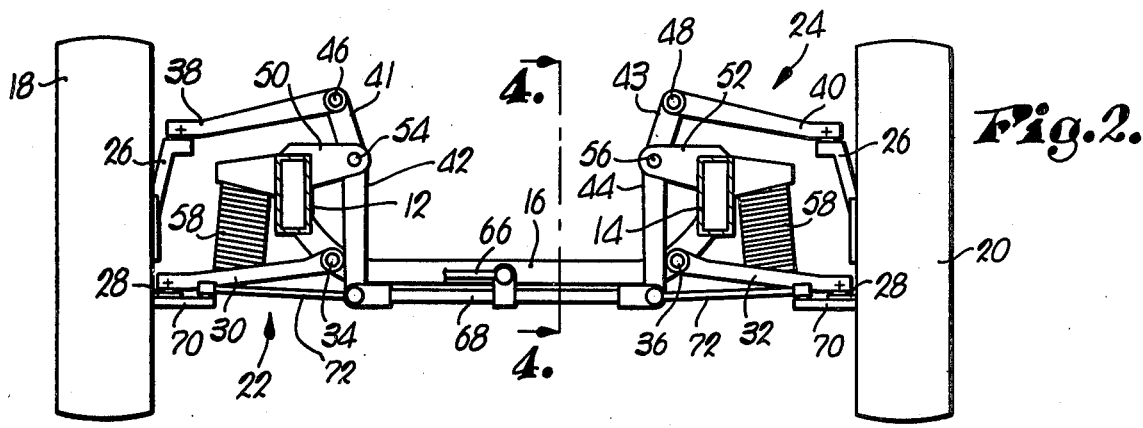
FIG. 2 is a rear, cross-sectional view of the suspension system shown in FIG. 1.
Figure 3:
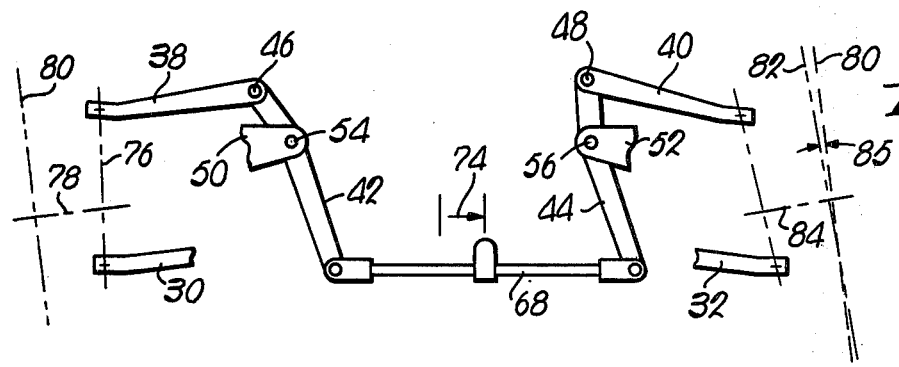
FIG. 3 is a fragmentary, rear view, similar to FIG. 2, but showing only the relationship of certain wheel-tilting linkage components when the wheels are turned in the left direction for executing a left turn of the vehicle.

Turning now to a description of the operation of the invention, when the steering apparatus 60 is conditioned such that the wheels 18 and 20 are directed straight ahead for forward travel of the vehicle in the direction of the arrow 10 as depicted in FIGS. 1 and 2, the suspension mechansims 22 and 24 function in the ordinary manner to independently suspend the wheels 18 and 20 on the vehicle's frame structure, with springs 58 absorbing shock and vibration from the road. Let it now be assumed that the vehicle is being steered to execute a left turn, in which case steering apparatus 60 has been operated in the manner to move connecting rod 66 along with steering bar 68 to the right as viewed in FIGS. 1 through 3. As steering bar 68 is shifted to the right, the pull rod 70 associated with the wheel 20 is moved outwardly causing the latter to pivot in a counterclockwise direction as viewed in FIG. 1, while the pull rod 70 associated with the wheel 18 is pivoted inwardly thereby causing wheel 18 to also pivot in a counterclockwise direction. Thus, the wheels 18 and 20 are aligned toward a left direction and remain rotating in parallel planes. As the steering bar 68 is displaced a finite distance to the right, as indicated by the arrow 74 in FIG. 3, from its normal central position corresponding to straight-ahead travel of the vehicle, the lower depending portions of control levers 42 and 44 simultaneously shift to the right and rotate slightly in a counterclockwise direction as viewed in FIGS. 2 and 3 about the respective pivots points 54 and 56, while upper elements 41 and 43 of the levers 42 and 44 and, more particularly, the pivot points 46 and 48, shift slightly toward the left also in a counterclockwise direction as viewed in FIGS. 2 and 3. Thus, during a left turn, the upper element 41 of control lever 42 functions to impart an outwardly directed lateral force upon the upper swing arm 38, in turn forcing wheel 18 to pivot outwardly about the lower support 28; simultaneously, the upper element 43 of control lever 44 likewise functions to impart an inwardly directed lateral force upon the upper swing arm 40, in turn forcing wheel 20 to pivot inwardly about its associated lower support 28. The above-discussed tilting action becomes clearly apparent from a comparison of the disposition of the suspension components in FIGS. 2 and 3; in FIG. 2 it may be observed that the outer end of the upper swing arm 38 is spaced somewhat inside the outer end of the lower swing arm 30, whereas, as shown in FIG. 3, during a left turn, the upper swing arm 38 has shifted laterally outward so that the outer end of the latter is nearly vertical aligned with the outer end of the lower swing arm 30 as indicated by the broken line 76, while the normally horizontal rotational axis of the wheel 18, indicated by the broken line 78, and its normally vertical rotational plane, shown by the broken line 80, are both tilted slightly toward the left at a prescribed angle from vertical. Similarly, when the suspension system is conditioned for normal forward vehicle travel, as in FIG. 2, the outer end of upper swing arm 40 is spaced somewhat inside the outer end of the lower swing arm 32, but during the course of a left turn, upper swing arm 40 is shifted to the left to increase this spacing, in turn causing the wheel 20 to tilt inwardly toward the left due to the pivotal movement of the latter about its associated mounting support 28. However, during such a left turn of the vehicle, due to the novel arrangement of the tilting linkage, the lateral displacement of the upper swing arm 40 exceeds that of the upper swing arm 38, so that the wheel 20 is tilted inwardly to the left to a greater degree than the degree of tilt imparted to the wheel 18. This tilting differential is observable in FIG. 3, wherein the inclination of the broken line 80, corresponding to the tilted rotational plane of the wheel 18, is also shown near the right wheel 20, and the rotational plane associated with the right wheel 20 is designated by the broken line 82, the rotational axis of wheel 20 being indicated by the broken line 84. The angle between the broken lines 80 and 82 designated by the numeral 85 therefore represents the degree by which the artificially produced tilt of wheel 20 exceeds the tilt of wheel 18.

Figure 5:
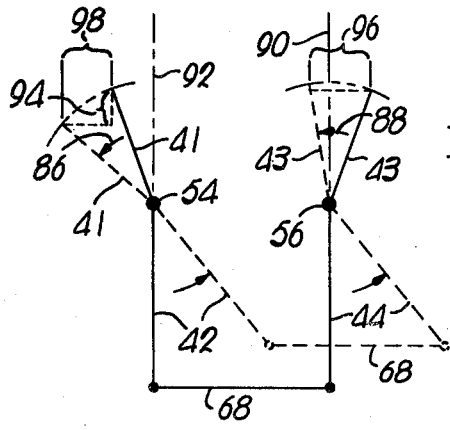
FIG. 5 is a diagrammatic representation of certain of the linkage components shown in FIG. 3, geometrically depicting the concept by which the linkage components impart differing degrees of tilt to the respective wheels.
Figure 4:
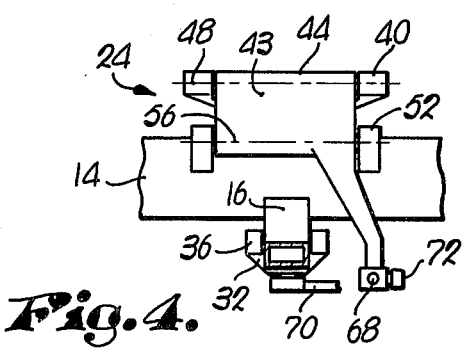
FIG. 4 is a cross-sectional view taken along line 4—4 in FIG. 2.

The reasons by which the symmetrically appearing tilting linkage achieves the novel wheel-tilting results described above may best be understood by referring now to FIG. 5, wherein certain of the previously discussed linkage components are shown in schematic form and designated by like reference numerals. During the execution of a left turn, the steering bar 68 shifts laterally to the right and upwardly from its normal position for straight-ahead steering shown in full line to a left-turn position shown in the phantom. Upon shifting of the steering bar 68, the left and right control levers 42 and 44, as well as their corresponding elements 41 and 43, pivot in a counterclockwise direction about the associated pivot points 54 and 56, it being understood that since levers 42 and 44 interconnected by the steering bar 68 are supported from fixed axes 54 and 56, the angles 86 and 88 respectively displaced by the elements 41 and 43 are virtually equal. It is to be noted that the element 43 shifts from a position on one side of the vertical axis 90 through pivot point 56 to the other side thereof, while the element 41 remains on one side of the vertical axis 92 through pivot point 54 during the shifting thereof. Consequently, it can be readily appreciated from the fundamental laws of geometry that the elevational displacement of the outer end of element 41 indicated by the numeral 94 is substantially greater than the like displacement of the outer end of element 43, whereas the lateral or horizontal displacement of the outer end of the element 43 indicated by the numeral 96 is markedly greater than the like displacement of the end of the element 41 indicated by the numeral 98. It follows, then, that since the lateral displacement of the end of element 43 exceeds that of the displacement of the end of element 41, the upper right swing arm 40 will be laterally displaced to the left, as viewed in FIGS. 2, 3 and 5, somewhat more than the lateral displacement of upper swing arm 38, so that the wheel 20 is caused to be tilted slightly more than the wheel 18 by the factor of the angle 85.

It can be further appreciated, due to the symmetry of the suspension mechanisms and their associated linkage elements, that upon the execution of a right turn by the vehicle, the lateral displacement experienced by the upper swing arm 38 will slightly exceed the like displacement of the upper swing arm 40 so that the wheel 18 is tilted inwardly slightly more than the degree of tilt imparted to the wheel 20.

From the foregoing it is clear that the invention provides especially simple means for selectively tilting each of a pair of steerable vehicle wheels in order to compensate for the differing magnitudes of lateral force acting upon such wheels during the course of a turn. Thus, it will be observed that my improved apparatus not only provides for the reliable accomplishment of the objects of the invention, but does so in a particularly simple and effective manner. It is recognized, of course, that those skilled in the art may make various modifications or additions to the preferred embodiment chosen to illustrate the invention without departing from the gist and essence of my contribution to the art. Accordingly, it is to be understood that the protection sought and to be afforded hereby should be deemed to extend to the subject matter claimed and all equivalents thereof fairly within the scope of the invention.

I claim:

1. In a mobile vehicle having frame structure, a pair of opposed, steerable wheel assemblies on opposite sides of said frame structure, each including a spindle mounting provided with a pair of elevationally spaced supports, means for operably coupling a corresponding one of said supports of each spindle mounting with said frame structure for pivotal movement of each of said spindle mountings about both a substantially upright axis and a first longitudinal axis extending in the general direction of forward movement of said vehicle, and shiftable steering means operably coupled with each of said spindle mountings for turning said wheel assemblies in either direction about said upright axes, the improvement of which comprises mechanism for tilting said wheel assemblies through differing angles about said first longitudinal axes respectively associated therewith when said wheel assemblies are turned about said upright axes from a normal straight-ahead steering position thereof with the angle of tilt of the wheel assembly on the side of the frame in the direction of said turning being less than the angle of tilt of the wheel assembly on the side of the frame opposite the direction of said turning, said mechanism including:
  a control lever for each wheel assembly respectively,
  each of said levers respectively being mounted on said frame structure for swinging movement about a corresponding substantially horizontal axis extending in the general direction of forward movement of said vehicle,
  each of said levers respectively having an element extending from said horizontal axis associated therewith in a direction inclined from vertical when said wheel assemblies are in said normal straight-ahead steering position thereof;
  a swing arm for each wheel assembly respectively,
  each of said arms respectively being operably coupled adjacent one extremity thereof with the other of said supports of the corresponding wheel assembly for relative pivotal movement therebetween about both said substantially upright axis and a second longitudinal axis extending in the general direction of forward movement of said vehicle,
  each of said arms respectively being operably coupled adjacent the other extremity thereof with said element of the corresponding one of said levers for relative pivotal movement therebetween about a third longitudinal axis extending in the general direction of forward movement of said vehicle; and
  means for operably coupling said steering means with said levers for swinging one of said elements toward vertical and the other of said elements away from vertical when said wheel assemblies are turned in one direction and for swinging said one element away from vertical and said other element toward vertical when said wheel assemblies are turned in the opposite direction.

2. The invention of claim 1, wherein each of said elements are inclined in opposite directions from vertical when said wheel assemblies are in said normal straight steering position thereof.

3. The invention of claim 2, wherein:
  said third longitudinal axes are spaced above the corresponding ones of said horizontal axes, and
  said elements extend upwardly and outwardly from the respectively corresponding ones of said horizontal axes when said wheel assemblies are in said normal straight steering position thereof.

4. The invention of claim 3, wherein said one extremity of each of said swing arms is respectively pivotally connected to the corresponding one of the upper supports of said wheel assemblies.

5. The invention of claim 1, wherein:
  each of said levers includes a lower portion extending from said horizontal axis associated therewith, and
  said coupling means is operably coupled with said lower portion of each of said levers for swinging said levers.

6. The invention of claim 5, wherein said steering means includes:
  a transversely extending, shiftable connecting rod having the opposite extremities thereof respectively pivotally connected with corresponding ones of said lower portions of said levers,
  said connecting rod being operative upon transverse shifting thereof to swing said levers in the same rotational direction about said horizontal axes respectively associated therewith upon operation of said steering means.

7. The invention of claim 6, wherein said opposite extremities of said connecting rod are also respectively operably coupled with corresponding ones of said wheel assemblies, and said connecting rod is operative upon transverse shifting thereof to cause said wheel assemblies to turn about their respective upright axes upon operation of said steering means.

8. In a steerable vehicle having a frame supported by a pair of laterally spaced, normally upright wheel assemblies connected therewith and mounted for pivotal movement about respective reference axes extending in the direction of travel of said vehicle, and a steering system, the improvement of which comprises mechanism for respectively tilting said wheel assemblies through differing angles in the same direction about said reference axes when the vehicle's steering system is operated to produce a change in the vehicle's direction of travel, said mechanism including:
  a pair of force-transmitting swing arms respectively operably associated with said wheel assemblies, and extending generally laterally inward toward each other and between said wheels,
  each of said swing arms having one extremity thereof pivotally connected to an associated wheel assembly about a longitudinal axes elevationally spaced from said reference axis;
  a pair of control lever elements respectively associated with said swing arms, and each having one extremity thereof connected with the opposite extremity of the associated swing arm for pivotal movement about a first longitudinally extending axis,
  the opposite extremity of each of said lever elements being mounted on said frame for pivotal movement about a second longitudinally extending axis,
  said first and second axes associated with each of said lever elements being elevationally and laterally spaced from each other when said wheels are in an upright, untilted position; and
  shiftable linkage means operably connected with said steering system and under control of the latter, and being further operably connected with the lever element associated with each of said swing arms,
  said linkage means being shiftable in response to the operation of said steering system during the turning of said vehicle in one direction to simultaneously produce respective lateral displacements of said swing arms in the same general direction,
  said lateral displacements of said swing arms causing said wheels to pivot about their respective reference axes and tilt toward said one direction,
  the magnitude of lateral displacement of the swing arm associated with the wheel tracking the outside path of the turn being greater than the magnitude of the displacement of the swing arm associated with the wheel tracking the inside path of said turn, the resultant degree of tilting of said outside tracking wheel being greater than the degree of tilting of said inside tracking wheel.

9. The invention of claim 8, wherein:
  said wheel assemblies are each mounted for pivotal movement about an essentially upright axis and are operably coupled with said steering means, said wheel assemblies being responsive to the operation of said steering means to turn about their respective said upright axes to produce turning of said vehicle in said one direction, and said first axes are disposed within respectively associated vertical planes lying between the respectively associated ones of said second axes and said wheel assemblies, and each of said control lever elements extend between the respectively associated ones of said first and second axes in a direction inclined from vertical, when said wheel assemblies are in said upright, untilted position.

10. The invention of claim 9, wherein said first axes are respectively spaced above said second axes.

11. The invention of claim 10, wherein said shiftable linkage means comprises:

a lever portion having one extremity thereof secured to said opposite extremity of each of said lever elements respectively and pivotable along with the latter about the respective ones of said second axes, and a transversely extending, elongate connecting rod having the opposite extremities thereof respectively pivotally connected to the other extremity of each of said lever portions, said connecting rod being operably coupled with said steering system and including means connected with each of said wheel assemblies, said connecting rod being transversely shiftable upon operation of said steering system during the execution of a turn, to turn said wheel assemblies and simultaneously pivot said lever portions in the same rotational direction whereby to produce pivotal movement of said control lever elements and said displacements of said swing arms.

* * * * *